United States Patent
Laws

(10) Patent No.: US 9,116,322 B1
(45) Date of Patent: Aug. 25, 2015

(54) CABLES INCLUDING STRENGTH MEMBERS THAT LIMIT JACKET ELONGATION

(71) Applicant: Superior Essex Communications LP, Atlanta, GA (US)

(72) Inventor: Jeffrey Scott Laws, Brownwood, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 14/096,797

(22) Filed: Dec. 4, 2013

Related U.S. Application Data

(60) Provisional application No. 61/736,786, filed on Dec. 13, 2012.

(51) Int. Cl.
*G02B 6/44* (2006.01)
*H01B 7/18* (2006.01)

(52) U.S. Cl.
CPC ................ *G02B 6/443* (2013.01); *H01B 7/183* (2013.01)

(58) Field of Classification Search
CPC .. G02B 6/4427; G02B 6/4432; G02B 6/4415; G02B 6/443; G02B 6/4433; G02B 6/4486; H01B 7/183; H01B 7/187; H01B 7/1875
USPC .......................... 385/13, 113; 156/53; 427/387
See application file for complete search history.

(56) References Cited

U.S. PATENT DOCUMENTS

| | | | |
|---|---|---|---|
| 2,998,472 A | 8/1961 | Bondon | |
| 4,515,435 A | 5/1985 | Anderson | |
| 5,109,457 A * | 4/1992 | Panuska et al. | 385/102 |
| 5,539,849 A | 7/1996 | Petisce | |
| 6,198,865 B1 | 3/2001 | Risch | |
| 6,461,691 B1 * | 10/2002 | Taylor et al. | 427/518 |
| 2003/0082380 A1 * | 5/2003 | Hager et al. | 428/375 |
| 2004/0057681 A1 * | 3/2004 | Quinn et al. | 385/110 |
| 2010/0054680 A1 | 3/2010 | Lochkovic | |
| 2013/0094821 A1 | 4/2013 | Logan | |
| 2013/0259434 A1 | 10/2013 | Bringuier | |

FOREIGN PATENT DOCUMENTS

CN 201197070 Y * 2/2009

OTHER PUBLICATIONS

Thermal expansion coefficients for some common materials, available at http://www.engineeringtoolbox.com/linear-expansion-coefficients-d_95.html.*

* cited by examiner

*Primary Examiner* — Peter Radkowski

(57) ABSTRACT

Cables including strength members that limit elongation of an outer jacket are described. A cable may include any number of transmission media, such as optical fibers, positioned within one or more cable cores or openings defined by an outer jacket. Additionally, at least one strength member may be in contact with the outer jacket. The at least one strength member may include central core or member and an external coating formed around or surrounding the central core. The external coating may be formed of one or more materials that limit elongation of the outer jacket to less than approximately 20 mm at temperatures up to approximately 70° C.

18 Claims, 2 Drawing Sheets

CABLES INCLUDING STRENGTH MEMBERS THAT LIMIT JACKET ELONGATION

CROSS-REFERENCE TO RELATED APPLICATION

This application claims priority to U.S. Provisional Application No. 61/736,786, filed Dec. 13, 2012, and entitled "Cables Including Strength Members" the entire contents of which are incorporated by reference herein.

TECHNICAL FIELD

Embodiments of the disclosure relate generally to cables including strength members and, more particularly, to cables that include one or more strength members that limit or reduce elongation of a cable jacket.

BACKGROUND

Strength members are utilized in a wide variety of different types of cables to provide structural support and to prevent damage to internal cable components. For example, strength members are typically included in fiber optic drop cables. Conventional strength members are formed from a wide variety of different materials, such as metal wires or rods, plastic rods, fiber-reinforced plastic ("FRP") rods, or fiberglass.

In some applications, an external coating is applied to a strength member in order to facilitate the formation of a physical bond between the strength member and an outer jacket of a cable. However, conventional strength member coatings typically have a melt temperature that is lower than the operating range of the cable. For example, the Telcordia GR-20 standard specifies an operating temperature range of –40° C. to 70° C. At elevated temperatures, conventional strength member coatings may break down, thereby weakening the physical bond between the strength member and the cable jacket. As a result, the jacket may elongate or creep, and it is possible that the cable may buckle or break. Thus, there is an opportunity for improved strength member coatings, as well as improved strength members and/or cables that utilize the improved strength member coatings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
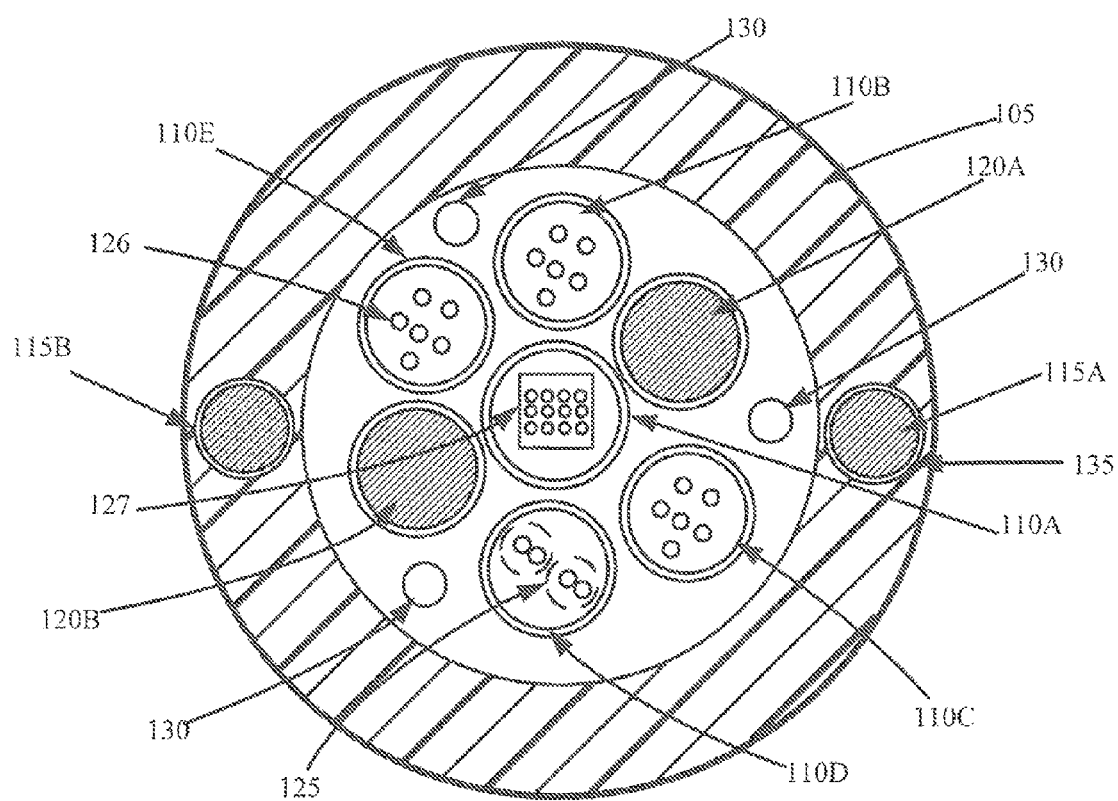
FIG. 1 is a cross-sectional view of an example cable including strength members, according to an illustrative embodiment of the disclosure.

Various embodiments of the present disclosure are directed to cables that incorporate one or more strength members. According to an aspect of the disclosure, at least one strength member incorporated into a cable may include an external coating that facilitates the creation of a physical bond between the strength member and another component of the cable, such as an outer jacket of the cable. Additionally, the strength member coating may include a melt temperature higher than an operating temperature range of the cable. For example, if the cable has a specified operating temperature range between approximately –40° C. and approximately 70° C., then the melt temperature of the strength member coating may be greater than 70° C. Thus, the strength member coating may have a higher melt temperature than conventional strength member coatings.

As a result of having a melt temperature greater than a maximum operating temperature of the cable, elongation of the cable jacket may be eliminated or significantly reduced at higher ambient temperatures. In the event that the cable is installed in an environment in which the ambient temperature approaches the maximum operating temperature (or exceeds a melt temperature of a conventional strength member coating), the physical bond between the strength member and cable jacket provided by the strength member coating will not break down. Thus, even as a force is applied to the cable, such as a force due to an installed tensile load exerted on the cable, the cable jacket will not drift or elongate along a length of the strength member. In other words, greater structural stability may be provided as a result of the strength member coating having a higher melt temperature than conventional strength member coatings.

Once applied to a strength member, the strength member coating may facilitate a physical bond between the strength member and a cable component, such as an outer jacket of a cable. Additionally, given the relatively high melt point of the strength member coating, elongation and/or movement of the outer jacket may be reduced or minimized in ambient conditions that approach the upper limits of the cable operating temperature range. In certain embodiments, at temperatures up to approximately 60° C., the cable jacket will experience negligible elongation or movement. For example, elongation may be less than approximately 1 mm. Further, at temperatures up to approximately 70° C., the cable jacket will experience elongation of less than approximately 20 mm. With conventional strength member coatings, elongation may be as much as approximately 200 mm at temperatures up to approximately 60° C. Thus, the higher melt temperature strength member coatings utilized in embodiments of the disclosure may drastically reduce elongation.

In various embodiments, strength members and strength member coatings may be utilized in association with a wide variety of different cables and/or cable types. These cables may include, for example, communication cables, fiber optic cables, hybrid or composite cables (e.g., cables including a combination of metallic conductors and optical fibers, etc.), electrical cables, etc. Additionally, the strength members and strength member coatings may be utilized in outside plant cables, premise cables, riser cables, plenum cables, underground cables, drop cables, and/or other cables as desirable. A few non-limiting example cables that may incorporate strength members and/or strength member coatings in accordance with various embodiments of the disclosure are described in greater detail below with reference to FIGS. 1 and 2.

As desired in various embodiments, a cable may be designed to satisfy a wide variety of suitable standards. For example, a cable containing one or more optical fibers may be designed to satisfy the Telcordia GR-20, Issue 3 standard and/or the Insulated Cable Engineers Association ("ICEA") S 110-717 standard. Applicable standards may specify, among other things, a temperature operating range for a cable. For example, the Telcordia GR-20 standard specifies an operating temperature range of −40° C. to 70° C. for fiber cables.

Any number of strength members may be incorporated into a cable as desired in various embodiments. For example, one, two, four, or any other desirable number of strength members may be incorporated into a cable. Additionally, a strength member may be incorporated into a cable at a wide variety of different positions. For example, one or more strength members may be embedded into an outer jacket of a cable. As another example, one or more strength members may be positioned between one or more elements in a cable core (e.g., optical fibers, optical fiber ribbons, buffer tubes, twisted pair conductors, etc.) and/or between one or more elements in a cable core and the outer jacket of the cable. In an example cable in which optical fibers are included in one or more buffer tubes, one or more strength members may be substituted for one or more buffer tubes, positioned between buffer tubes, and/or positioned between one or more buffer tubes and an outer jacket of the cable. Indeed, a wide variety of different cable configurations may incorporate strength members at any desirable locations or combination of locations.

Strength members may be formed from a wide variety of suitable materials. For example, strength members may be formed from metal wires (e.g., steel wire, etc.), metal rods, plastic rods, fiber-reinforced plastic ("FRP") rods, glass-reinforced plastic ("GRP") rods, fiberglass, or any other suitable material or combination of materials. Additionally, a strength member may have any desired diameter and/or other dimensions (e.g., cross-sectional area, thickness, etc.). In certain embodiments, the dimensions of a strength member may be determined based at least in part upon a desired positioning of the strength member and/or a desired application for a cable. Additionally, in certain embodiments, a strength member may have a diameter that is greater than the diameter of a buffer tube incorporated into a cable.

According to an aspect of the disclosure, an external coating may be formed on a strength member in order to encourage or create a physical bond between the strength member and another component of a cable, such as the cable outer jacket. An external coating may be formed from a wide variety of suitable materials and/or combinations of materials. For example, an external coating may be formed from an ultraviolet ("UV") curable adhesive, a thermal curable adhesive, a polymer, a copolymer, and/or a hot melt adhesive material. In certain embodiments an external coating may include an ethylene-acrylic acid ("EAA") copolymer, ethyl vinyl acetate ("EVA"), and/or one or more other suitable compounds. Examples of suitable EAA copolymers include, but are not limited to, PRIMACOR™ copolymers, which are produced by The Dow Chemical Company®, and Nucrel® copolymers (e.g., Nucrel® 3990, etc.), which are produced by E.I. du Pont Nemours and Company, Inc.®.

Additionally, a wide variety of suitable methods and/or techniques may be utilized to apply an external coating to a strength member. For example, a coating may be applied to a strength member as a hot melt adhesive. As another example, a coating may be extruded onto a strength member. As yet another example, a liquid coating may be dripped or sprayed onto a strength member. In certain embodiments, following application, the coating may be processed using any number of suitable curing processes, such as UV curing and/or heat curing. Additionally, in certain embodiments, a coating may be allowed to solidify or harden following incorporation of the strength member into a cable. For example, a strength member coating may be applied in an in-line process as a cable is assembled. In other embodiments, a coated strength member may be further process (e.g., cured, heated, etc.) during construction of a cable or following incorporation of the strength member into the cable.

Once applied to a strength member, the strength member coating may facilitate a physical bond between the strength member and another cable component, such as an outer jacket of a cable. Additionally, given the relatively high melt point of the strength member coating, elongation and/or movement of the outer jacket may be reduced or minimized in ambient conditions that approach the upper limits of the cable operating temperature range. In certain embodiments, at temperatures up to approximately 60° C., the cable jacket will experience negligible elongation or movement. For example, elongation may be less than approximately 1 mm. Farther at temperatures up to approximately 70° C., the cable jacket will experience elongation of less than approximately 20 mm. With conventional strength member coatings, elongation may be as much as approximately 200 mm at a temperature up to approximately 60° C. Thus, the higher melt temperature strength member coatings utilized in embodiments of the disclosure may drastically reduce elongation.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Turning now to FIG. 1, a cross-sectional view of example cable 100 including strength members is illustrated. The illustrated cable 100 is a composite cable that includes both twisted pair conductors and optical fibers. However, embodiments of the disclosure are applicable to a wide variety of different types of cables including, but not limited to, optical fiber cables, twisted pair cables, copper cables, coaxial cables, power cables, and hybrid or composite cables that include a plurality of different types of transmission media. For example, embodiments of the disclosure may be applicable to optical fiber cables and/or composite cables that include optical fibers.

As desired, the cable 100 may be designed to satisfy any number of applicable cable standards. For example, the cable 100 may be designed to satisfy one or more standards applicable to cables containing optical fibers, such as the Telcordia GR-20 standard and/or the Insulated Cable Engineers Association ("ICEA") S 110-717 standard. Applicable standards may specify a wide variety of specifications for the cable, such as an operating temperature range. In certain embodiments, the cable 100 may be a communications cable rated for an operating temperature of about −40 to about 70 degrees Centigrade.

The cable 100 may include a wide variety of different components as desired in various embodiments, such as one or more transmission media (e.g., optical fibers, twisted pairs, metal conductors, etc.), one or more power conductors, an outer jacket, one or more shield layers, one or more buffer tubes, water blocking material, flame retardant material, and/or smoke suppressing material. The transmission media may be positioned within any number of openings or cores formed within a cable jacket. Additionally, as explained in greater detail below the cable 100 may include one or more strength members, such as one or more strength members that limit elongation of the cable jacket.

With reference to FIG. 1, the cable 100 may include an outer jacket 105 that defines an outer periphery of the cable 100. The jacket 105 may enclose the internal components of the cable 100, seal the cable 100 from the environment, and provide strength and structural support. The jacket 105 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, cholorosulphonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 105 can include flame retardant and/or smoke suppressant materials. As desired, the outer jacket 105 may include carbon black or other suitable material for protection against exposure to ultraviolet ("UV") light. As desired in various embodiments, the outer jacket 105 may include a single layer or, alternatively, multiple layers of material. As desired, the outer jacket 105 may be characterized as an outer sheath, a casing, a circumferential cover, or a shell.

The jacket 105 may enclose one or more openings in which other components of the cable 100 are disposed. At least one opening enclosed by the jacket 105 may be referred to as a cable core, and any number of transmission media and/or other cable components may be disposed in a cable core. In the cable 100 illustrated in FIG. 1, a plurality of buffer tubes 110A-E may be situated within a cable core. Other cable components, such as transmission media (e.g., optical fibers, optical fiber ribbons, twisted pairs, etc.), may be positioned within the buffer tubes 110A-E as desired. In other embodiments, transmission media may be positioned within a cable core without the use of buffer tubes or other protective coverings. In other words, transmission media may be loosely positioned within a cable core. In yet other embodiments, separators or dividers may be positioned within a cable core between transmission media and/or buffer tubes. Indeed, a wide variety of different cable constructions may be utilized in accordance with various embodiments of the disclosure.

In certain embodiments, the jacket 105 may be extruded or poltruded over other cable components during construction of the cable 100. As a result, the cable core may be defined by the size of the internal component(s) during cable construction. In other embodiments, the jacket 105 may be extruded or formed via one or more dies in order to define a desired cable core. In yet other embodiments, the jacket 105 may be extruded or formed over or one or more removable elements (e.g., rods, etc.) in order to define at least one cable core into which other components can be inserted or positioned. Alternatively, at least one opening may be bored or otherwise formed from a jacket 105, and cable components can be inserted or positioned within the at least one opening.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket may be formed to result in any desired shape. The jacket 105 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate duct or conduit installation, and the cable 100 may be designed to withstand a specified installation tensile loading, such as a loading of about 600 pounds of force.

As desired, any number of strength members may be incorporated into the cable 100 at a wide variety of suitable locations. In certain embodiments, one or more strength members 115A-B may be embedded in the outer jacket 105. For example, the jacket 105 may be formed or extruded around one or more strength members 115A-B. Embedded strength members 115A-B may be located at any desired points within the outer jacket 105. For example, the strength members 115A-B may be located on opposing lateral sides of a longitudinal axis of the cable 100. The strength members 115A-B may enhance tensile strength of the cable 100. In certain embodiments, the strength members 115A-B may cause the outer surface of the outer jacket 105 to bulge or protrude (not illustrated) lateral to the strength rods 115A-B. In other embodiments, one or more strength members 120A-B may be situated within a cable core, such as adjacent to one or more buffer tubes 110A-E and/or between one or more buffer tubes 110A-E (or transmission media) and the outer jacket 105. Indeed, a wide variety of strength member configurations may be utilized.

In certain embodiments, the cable 100 may include an armor (not shown) inside the outer jacket 105. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor.

The core of the cable 100 may include any number of suitable transmission media, such as optical fibers, optical fiber ribbons, twisted pairs of individually insulated electrical conductors, coaxial conductors, power conductors, etc. As shown in FIG. 1, certain transmission media may be situated within buffer tubes 110A-E located within the cable core. However, as desired in other embodiments, one or more transmission media may be provided without corresponding buffer tubes. For example, one or more twisted pairs may be loosely provided (e.g., individually provided, bundled together, etc.) within a cable core or incorporated into a suitable wrap or shield, such as a shield tape.

In the event that twisted pairs are included in the cable 100, any number of twisted pairs, such as illustrated pairs 125, may be provided. Each twisted pair 125 can early voice, data, or some other form of information. For example, each twisted pair 125 can carry data in a range of about one to ten Giga bits per second ("Gbps") or another appropriate speed, whether faster or slower. In certain embodiments, one or more twisted pairs 125 may be positioned within a buffer tube, such as buffer tube 110D. Alternatively, a film (e.g., a tape film formed from polyester, another suitable polymer, and/or other suitable materials) may be wrapped around the twisted pairs 125 to form a tube. In other embodiments, a jacket or shield may be utilized in place of a buffer tube or film, such as an extruded inner jacket. As desired, a water-blocking material (e.g., a gelatinous substance, a semi-liquid substance, a thermoplastic rubber floodant ("ETPR"), dry filling compound, etc.) may be disposed in the volume formed by a tube, film, or jacket as desired in various embodiments. In other embodiments, a tube, film, or jacket may be filled with a gas (e.g., air, etc.), a powder, a moisture absorbing material, a water-swellable substance, dry filling compound, a foam material, or any other suitable material that fills in interstitial spaces between the twisted pairs 125. In yet other embodiments, one or more twisted pairs may be loosely positioned within a cable core without the use of a tube, inner jacket, or other layer. Additionally, although FIG. 1 illustrates twisted pairs 125 situated in an outer buffer tube, twisted pairs may be incorporated into a cable at other positions, such as at the center of the cable core. Alternatively, certain embodiments may not include any twisted pairs.

Each twisted pair may include two electrical conductors, each covered with suitable insulation. As desired, each of the twisted pairs may have the same twist lay length or alternatively, at least two of the twisted pairs may include a different twist lay length. For example, each twisted pair 125 may have a different twist rate. The different twist lay lengths may function to reduce crosstalk between the twisted pairs. Additionally, in certain embodiments, each of the twisted pairs 125 may be twisted in the same direction (e.g., clockwise, counter clockwise). In other embodiments, at least two of the twisted pairs 125 may be twisted in opposite directions.

The electrical conductors may be formed from any suitable electrically conductive material, such as copper, aluminum, silver, annealed copper, gold, or a conductive alloy. Additionally, the electrical conductors may have any suitable diameter, gauge, and/or other dimensions. For example, the electrical conductors may be formed as approximately 23 American Wire Gauge ("AWG") conductors, approximately 24 AWG conductors, or as conductors having any other suitable gauge. In certain embodiments, the electrical conductors may be formed as solid conductors. In other embodiments, the electrical conductors may be formed from a plurality of electrical conductive strands that are twisted together.

The insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MEA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. In certain embodiments, the insulation may be formed from multiple layers of a plurality of suitable materials. In other embodiments, the insulation may be formed from one or more layers of foamed material. As desired, different foaming levels may be utilized in accordance with twist lay length to result in insulated twisted pairs having an equivalent or approximately equivalent overall diameter. In certain embodiments, the insulation may additionally include other materials, such as a flame retardant material and/or a smoke suppressant material.

Each twisted pair 125 can carry data or some other form of information, for example in a range of about one to ten Giga bits per second ("Gbps") or another appropriate frequency, whether faster or slower. In certain embodiments, each twisted pair 125 supports data transmission of about two and one-half Gbps (e.g. nominally two and one-half Gbps), with the cable 100 supporting about ten Gbps (e.g. nominally ten Gbps). In certain embodiments, each twisted pair 125 supports data transmission of about ten Gbps (e.g. nominally ten Gbps), with the cable 100 supporting about forty Gbps (e.g. nominally forty Gbps).

Additionally, in certain embodiments, a flexible member or separator (not illustrated) may be provided between one or more twisted pairs 125, and the flexible member may maintain a desired orientation and/or desired positioning of one or more twisted pairs. A flexible member may be formed from a wide variety of suitable materials, such as polypropylene, PVC, polyethylene, FEP, ethylene chlorotrifluoroethlyene ("ECTFE"), or some other suitable polymeric or dielectric material. If used, a flexible member may be filled, unfilled, foamed, un-foamed, homogeneous, or inhomogeneous may or may not include additives (e.g., smoke suppressants, etc.). In certain embodiments, the flexible member may include electrically conductive patches that are electrically isolated from one another to provide one or more shields. In various embodiments, a flexible member may be continuous along a longitudinal length of the cable 100 or discontinuous (i.e., formed with a plurality of discrete sections) along a longitudinal length of the cable 100.

In certain embodiments, twisted pairs 125 may be shielded or unshielded. For example, a tube or film in which twisted pairs 125 are situated may include electrically conductive material (e.g., continuous electrically conductive material or one or more electrically conductive patches or sections that are electrically isolated from one another, etc.) to provide one or more shields for the twisted pairs 125. Alternatively, twisted pairs 125 may be individually shielded or groups of twisted pairs may be shielded. As yet another alternative (or in addition to other types of shielding), a suitable shield layer may be formed inside the outer jacket 105 (i.e., within a cable core) to surround a plurality of twisted pairs incorporated into a cable. As desired, a shield may be formed as a metallic foil or other electrically conductive material that covers one or more twisted pairs. Indeed, a wide variety of shielding arrangements is available for twisted pair conductors.

With continued reference to FIG. 1, one or more buffer tubes 110A, 110B, 110C, 110E situated within the cable core may be configured to contain or house optical fibers, such as the illustrated optical fibers 126. In certain embodiments, one or more outer buffer tubes may be situated around a central tube (or a central group of twisted pairs, a central strength member, or other central cable component(s)). Other arrangements of buffer tubes may be utilized in other embodiments. Additionally, any number of buffer tubes may be utilized as desired. A buffer tube may be formed from any number of suitable materials, such as polybutylene terephthalate (PBT), polypropylene, nucleated polypropylene or any suitable polymer. In certain embodiments, a buffer tube may be formed as a composite or include multiple polymeric materials. Further, each buffer tube may have any suitable inner and/or outer diameters as desired in various applications.

Any number of optical fibers may be positioned within a buffer tube. In certain embodiments, optical fibers may be loosely positioned in a tube, wrapped or bundled together, or provided in one or more ribbons. FIG. 1 illustrated loose optical fibers 127 positioned in a certain buffer tubes and a stacked optical fiber ribbon 127 positioned in another buffer tube. In certain embodiments, water-blocking material (e.g., a water blocking gel, grease, etc.) may also be provided within a buffer tube. Alternatively, a buffer tube may be filled with a gas, such as air, powder, a moisture absorbing material, a water-swellable substance, dry filling compound, or foam material, for example in interstitial spaces between the optical fibers.

In other embodiments, one or more microtubes (not shown) may be utilized in place of buffer tubes. Each microtube may house any desired number of optical fibers, such as two, three, four, eight, twelve, or some other number of optical fibers. A microtube may have an inner diameter that is sized to allow the optical fibers to move relative to one another while preventing the optical fibers from crossing over or overlapping one another. In other words, the microtube may permit the optical fibers to flex or move as the cable is flexed or bent while simultaneously maintaining the position of each optical fiber relative to the other optical fibers. In certain embodiments, an inner diameter of the microtube may be determined based at least in part on the number of optical fibers to be positioned within the microtube and/or the outer diameters of the optical fibers. As a result of using one or more microtubes, it may be possible to reduce or minimize the diameter of the cable relative to cables that incorporate loose buffer tubes.

In yet other embodiments, one or more tight-buffered optical fibers may be positioned within a cable core without the use of buffer tubes or microtubes. A tight-buffered optical fiber may be formed by applying or forming a cover, jacket, or buffer layer over an individual optical fiber. These buffer layers protect the fiber from physical damage and limit microbending of the fiber. A tight-buffer layer may be formed from any number of suitable materials and/or combinations of materials, such as a wide variety of polymeric materials. Additionally, in certain embodiments, a plurality of tight-buffered fibers may be stranded or twisted together within a cable core. Indeed, a wide variety of different optical fiber arrangements may be utilized as desired in various embodiments.

Each optical fiber utilized in the cable 100 may be a single mode fiber, multi-mode fiber, multi-core, or some other optical waveguide that carries data optically. Additionally, each optical fiber may be configured to carry data at any desired wavelength (e.g., 1310 nm, 1550 nm, etc.) and/or at any desired transmission rate or data rate, such as a transmission rate between approximately 10 Giga bits per second ("Gbps") and approximately 40 Gbps. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. For example, single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, at least one "rip cord" or filler may be incorporated into the cable 100. For example, a ripcord may be disposed within a cable core. A ripcord may facilitate separating the jacket 105 from other components of the cable 100. In other words, the rip cord may help open the cable 100 for installation or field service. A technician may pull the ripcord during installation in order to access internal components of the cable 100.

With continued reference to FIG. 1, one or more strength members 120A-B may be situated within the cable core. For example, within a ring of buffer tubes, one or more buffer tubes may be replaced with strength members. These strength members 120A-B (as well as strength members 115A-B that may be optionally embedded within the cable jacket 105) are described in greater detail below.

In certain embodiments, the cable 100 may include water swellable materials or water dams for impeding flow of any water that inadvertently enters the cable 100, for example due to damage of the outer jacket 105. Upon contact with water, water swellable materials may absorb the water and swell, helping to prevent the water from damaging the transmission media. Impeding the longitudinal flow of water also helps confine any fiber damage to facilitate repair. Accordingly, water dams may help to limit water damage.

In certain embodiments, one or more water swellable yarns 130 may be incorporated into the cable 100. For example, one or more water swellable materials may be positioned in interstices between core components, such as between one or more buffer tubes or between one or more buffer tubes and the cable jacket 105. In other embodiments, a tape including water swellable materials may be positioned in a cable core and wrapped around one or more other cable components, such as buffer tubes and/or various transmission media. In yet other embodiments, individual core components may be partially or completely wrapped with water swellable materials. As desired in various embodiments, water swellable materials may be provided in a continuous or discontinuous manner along a longitudinal length of the cable 100. Additionally or alternatively, water blocking material (e.g., water blocking dams) may be intermittently incorporated into the cable core. A wide variety of suitable water blocking materials and/or combinations of materials may be utilized as desired.

As set forth above, the cable 100 may include one or more strength members, such as strength members 115A-B and strength members 120A-B. A strength member (generally referred to as strength member 115) may have a core that is formed from a wide variety of suitable materials and/or combinations of materials. For example, the strength member 115 may be formed from a metal wire (e.g., a steel wire, etc.), a metal rod, a plastic rod, a fiber-reinforced plastic ("FRP") rod, a glass-reinforced plastic ("GRP") rod, fiberglass, or any other suitable material or combination of materials. Additionally, a strength member 115 may have any desired diameter and/or other dimensions as desired in various embodiments.

According to an aspect of the disclosure, at least one strength member 115 may be coated, surrounded by, or covered with an external coating 135. The external coating 135 may be formed on the strength member 115 in order to encourage or create a physical bond between the strength member 115 and another component of a cable 100, such as the cable jacket 105. The external coating 135 may be formed from a wide variety of suitable materials and/or combinations of materials. For example, the external coating 135 may be formed from an ultraviolet ("UV") curable adhesive, a thermal curable adhesive, a polymer, a copolymer, and/or a hot melt adhesive material. In certain embodiments, an external coating may include an ethylene-acrylic acid ("EAA") copolymer, ethyl vinyl acetate, and/or one or more other suitable compounds. Examples of suitable EAA copolymers include, but are not limited to, PRIMACOR™ copolymers, which are produced by The Dow Chemical Company®, and Nucrel® copolymers (e.g., Nucrel® 3990, etc.), which are produced by E.I. du Pont Nemours and Company, Inc.®.

Additionally, a wide variety of suitable methods and/or techniques may be utilized to apply the external coating 135 to the strength member 115. For example, the coating 135 may be applied to the strength member 115 as a hot melt adhesive. As another example, the coating 135 may be extruded onto the strength member 115. As yet another example, a liquid coating may be dripped or sprayed onto the strength member 115. In certain embodiments, following application, the coating 135 may be processed using any number of suitable curing processes, such as UV curing and/or heat curing. Additionally, in certain embodiments, the coating 135 may be allowed to solidify or harden following incorporation of the strength member 115 into the cable 100. For example, the strength member coating 135 may be applied in an in-line process as a cable 100 is assembled. In other embodiments, a coated strength member 115 may be further process (e.g., cured, heated, etc.) during construction of the cable 100 or following incorporation of the strength member 115 into the cable 100.

Once applied to a strength member 115, the strength member coating 135 may facilitate a physical bond between the strength member 115 and another cable component, such as the outer jacket 105 of the cable 100. Additionally, the strength member coating 135 may have a melt point that is higher than a temperature operating range (e.g., approximately 40° C. to approximately 60° C.) of the cable 100. Given the relatively high melt point of the strength member coating 135, elongation and/or movement of the outer jacket 105 may be reduced or minimized in ambient conditions that approach the upper limits of the cable operating temperature range. In certain embodiments, at temperatures up to approximately 60° C., the cable jacket 105 may experience negligible elongation or movement. For example, elongation may be less than approximately 1 mm. Further, at temperatures up to approximately 70° C., the cable jacket 105 may experience elongation of less than approximately 20 mm. With conventional strength member coatings, elongation may be as much as approximately 200 mm at temperatures up to approximately 60° C. Thus, the higher melt temperature strength member coating 135 may drastically reduce elongation.

The cable 100 illustrated in FIG. 1 is a relatively complex cable including a wide variety of components. The various components of the cable 100 are also provided by way of example only to describe different cable configurations in which strength members may be incorporated, as well as various positions at which strength members may be situated. Indeed, a wide variety of modifications may be made to the cable 100 of FIG. 1 as desired in various embodiments of the invention. Other cables in which strength members may be incorporated may include more or less than the components illustrated in FIG. 1.

Figure 2:
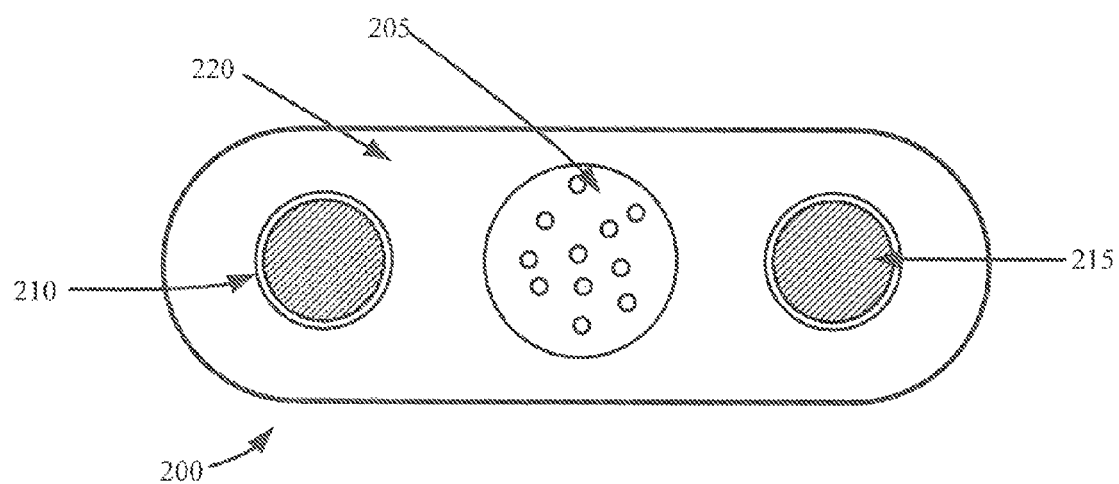
FIG. 2 is a cross-sectional view of another example cable including strength members, according to an illustrative embodiment of the disclosure.

FIG. 2 is a cross-sectional view of another example cable 200 including strength members, according to an illustrative embodiment of the disclosure. The cable 200 illustrated in FIG. 2 may include one or more optical fibers 205, one or more strength members 210, 215 that are embedded or surrounded by an external jacket 220. The optical fibers 205 may be loosely positioned in a cable core, tight-buffered, positioned in a buffer tube, positioned in one or more microtubes, or positioned in any other suitable sheath. Additionally, the two strength members 210, 215 are illustrated as being positioned on opposing sides of an optical fiber 205 (or bundle of fibers). Accordingly, a suitable fiber optic drop cable may be formed. In other embodiments, one or more strength members may be positioned in other locations.

Each of the components illustrated in the cable 200 of FIG. 2 may be similar to the components previously described with reference to FIG. 1 above. Thus, a strength member 210, 215 may include a strength member coating that helps to reduce or limit elongation, movement, and/or buckling of the outer jacket 205 in higher temperature environments. A wide variety of other suitable cable designs other than those illustrated in FIGS. 1 and 2 may incorporate coated strength members as described herein. The cable designs may include more or less components than the cables illustrated in FIGS. 1 and 2.

A wide variety of suitable methods and/or techniques may be utilized to test certain strength members contemplated by this disclosure. In this regard, the physical bond formed between a strength member and a cable jacket may be tested at a wide variety of different temperatures and/or with different forces applied to the cable. As a result of the testing, elongation and/or movement of a cable jacket may be measured, and therefore, the improved properties of the described strength member coatings may be verified.

In one example testing system, a cable incorporating a coated strength member may be suspended within an environmental chamber, and a static load (e.g., a static load of approximately 90 pounds, etc.) may be applied to the cable. One or more suitable markers may be positioned on the cable at predetermined locations. For example, one or more clamps may be positioned at predetermined locations relative to a center point or other reference point along a length of the cable. In one example, a twelve foot long sample of cable may be suspended, and two clamps may be respectively attached to the cable on either side of a center point (e.g., the six foot point) of the cable approximately one foot away from the center point (e.g., at the five foot point and the seven foot point).

The cable sample may be exposed to a wide variety of temperature conditions over time in order to measure or determine movement of the clamps resulting from elongation (i.e., deformation) of the cable's external jacket. For example, the cable may be exposed to a 60° C. temperature for a period of time (e.g., approximately 24 hours) and measurements may be taken for clamp movement. As another example, the cable may be exposed to a 70° C. temperature for a period of time (e.g., approximately 24 hours) and measurements may be taken for clamp movement. According to an aspect of the disclosure, overall clamp movement may be negligible (e.g., less than approximately 1 mm) for temperatures up to 60° C. Additionally, overall clamp movement may be less than approximately 20 mm at temperatures up to approximately 70° C.

A wide variety of other suitable methods and techniques may be utilized as desired to test a cable for jacket elongation and/or relative movement of other cable components. Additionally, a wide variety of different environmental conditions and stresses may be applied to a cable in these various testing methods.

Conditional language, such as among others, "can," "could," "might" or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A cable comprising:
    an outer jacket extending lengthwise and defining a cable core;
    at least one transmission media positioned within the cable core; and
    at least one strength member in contact with the outer jacket, the at least one strength member comprising an external coating having a melt temperature greater than approximately 70° C.,
    wherein, when a static load of approximately ninety pounds is attached to the cable for approximately one day at a temperature of approximately 70° C., the external coating limits movement of a marker positioned on the outer jacket to less than approximately 20 mm relative to an initial starting position of the marker.

2. The cable of claim 1, wherein the marker comprises a clamp positioned on the outer jacket.

3. The cable of claim 1, wherein the at least one strength member is embedded in the outer jacket.

4. The cable of claim 1, wherein the at least one strength member is positioned between the at least one transmission media and an inner surface of the outer jacket.

5. The cable of claim 1, wherein the at least one strength member comprises a core formed from at least one of a metal wire, a metal rod, a plastic rod, a fiber-reinforced plastic rod, or a glass-reinforced plastic rod.

6. The cable of claim 1, wherein the external coating comprises at least one of a hot melt adhesive, an extruded copolymer, an ultraviolet curable adhesive, or a thermal curable adhesive.

7. The cable of claim 1, wherein the external coating comprises ethylene-acrylic acid.

8. The cable of claim 1, wherein the external coating comprises ethyl vinyl acetate.

9. The cable of claim 1, wherein the at least one transmission media comprises one or more optical fibers.

10. A cable comprising:
    at least one transmission media;
    an outer jacket formed around the at least one transmission media; and
    at least one strength member embedded in the outer jacket, the at least one strength member comprising a core and an external coating formed around the core and having a melt temperature greater than approximately 70° C., the external coating limiting elongation of the outer jacket to less than approximately 20 mm when a static load of approximately ninety pounds is attached to the cable for approximately one day at a temperature of approximately 70° C.

11. The cable of claim 10, wherein the strength member core comprises at least one of a metal wire, a metal rod, a plastic rod, a fiber-reinforced plastic rod, or a glass-reinforced plastic rod.

12. The cable of claim 10, wherein the external coating comprises at least one of a hot melt adhesive, an extruded copolymer, an ultraviolet curable adhesive, or a thermal curable adhesive.

13. The cable of claim 10, wherein the external coating comprises ethylene-acrylic acid.

14. The cable of claim 10, wherein the external coating comprises ethyl vinyl acetate.

15. A cable comprising:
    a jacket extending in a longitudinal direction and defining an opening;
    at least one transmission media extending in the longitudinal direction and positioned in the opening; and
    at least one strength member embedded in the jacket, each of the at least one strength member comprising an external coating surrounding a central core and having a melt temperature greater than approximately 70° C., the external coating limiting movement due to elongation of a given point along the jacket to less than approximately 20 mm when a static load of approximately ninety pounds is attached to the cable for approximately one day at a temperature of approximately 70° C.

16. The cable of claim 15, wherein the central core comprises at least one of a metal wire, a metal rod, a plastic rod, a fiber-reinforced plastic rod, or a glass-reinforced plastic rod.

17. The cable of claim 15, wherein the external coating comprises at least one of a hot melt adhesive, an extruded copolymer, an ultraviolet curable adhesive, or a thermal curable adhesive.

18. The cable of claim 15, wherein the external coating comprises one of ethylene-acrylic acid or ethyl vinyl acetate.

* * * * *